INVENTOR
TENNY LODE

INVENTOR
TENNY LODE

INVENTOR
TENNY LODE

United States Patent Office 3,484,692
Patented Dec. 16, 1969

1

3,484,692

SUPERREGENERATIVE CIRCUIT WITH SWITCH MEANS PROVIDING REFERENCE AND MEASURING STATES

Tenny D. Lode, Madison, Wis., assignor to Rosemound Engineering Company, Minneapolis, Minn., a corporation of Minnesota Filed Jan. 14, 1965, Ser. No. 425,463
Int. Cl. G01r *1/30*
U.S. Cl. 324—123 8 Claims

ABSTRACT OF THE DISCLOSURE

A circuit for detecting polarity and indicating magnitude of small voltages. A voltage signal is capacitively coupled to a D.C. amplifier which has a capacitively coupled positive feedback path capable of driving the amplifier to saturation in a superregenerative mode. Switching means is used to periodically de-activate the feedback path and remove the voltage signal in order to reference the circuitry at a stable condition. The amplifier output may be applied to a D.C. voltmeter.

This invention relates to the measurement of low level electrical voltages and currents. More particularly, it relates to the measurement of small deviations of voltage or current from a nominal null or zero value.

D.C. null detectors are employed to indicate the balance or unbalance of precision resistance bridges and in other applications. Usually a null detector is primarily expected to provide an accurate indication of the polarity of an unbalance or error signal. A precise indication of the magnitude of the signal is generally less important. Optical readout galvanometers in which a mirror is attached to a movable coil and a beam of light used as the movable "pointer" have been used for many years. Their disadvantages are a sensitivity to mechanical vibration and a slow response. More recently, chopper stabilized electronic amplifiers have been developed which are capable of amplifying signals of a few microvolts and less. The major disadvantage of such amplifiers is that they are neither simple nor inexpensive.

An object of the present invention is to provide methods and means for the construction of electrical null detectors. A further object is to provide a null detector which will be insensitive to vibration, of a reasonably rapid response and relatively inexpensive.

In a particular form of the present invention a repetitively operating switch or chopper establishes a D.C. reference level and alternately switches a simple amplifier into stable and unstable (superregenerative) configurations. This provides almost unlimited gain with relatively simple circuitry. A voltmeter or other suitable means is connected to the amplifier output to serve as a readout device or indicator.

Figure 1:
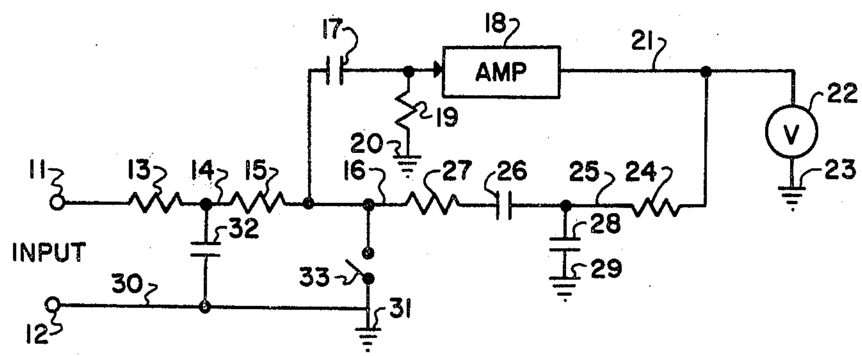
FIGURE 1 is a schematic illustration of a first form of the invention showing the use of a single chopper switch and a single input amplifier.

Referring now to the drawings, FIGURE 1 includes input terminals 11 and 12. Terminal 11 connects via resistor 13 to line 14. Line 14 connects via resistor 15 to line 16 which in turn connects via capacitor 17 to the input of amplifier 18. Resistor 19 connects from the input of amplifier 18 to ground 20. The output of amplifier 18 on line 21 connects to a first side of voltmeter 22, the second side of which connects to ground 23. Line 21 also connects via resistor 24 to line 25, which connects via the series combination of capacitor 26 and resistor 27 to line 16. Capacitor 28 connects from line 25 to ground 29. Terminal 12 connects via line 30 to ground 31. Capacitor 32 connects from line 14 to line 30. Switch 33 connects from line 16 to line 30 and ground 31.

To describe the operation of the circuit of FIGURE 1 we assume that a small unidirectional voltage is applied across input terminals 11 and 12 thereby charging capacitor 32. Switch 33 is assumed to have been closed long enough to allow the various circuit voltages to reach essentially equilibrium values. When switch 33 is opened, a fraction of the input voltage as determined by the relative magnitudes of resistors 13, 15 and 19 is applied to the input of amplifier 18. Amplifier 18 is assumed to have a moderate positive gain, for example, of the order of 10. Capacitor 28 will then begin charging in the same direction as the polarity of the input signal at a rate determined by the output of amplifier 18 and the time constant of capacitor 28 and resistor 24. As capacitor 28 charges, a positive or regenerative feedback signal is applied to the amplifier input through capacitor 26 and resistor 27. Because of this positive feedback the amplifier output will increase as a generally exponential function of time until amplifier 18 saturates or some other limit is reached. The polarity of the output of amplifier 18 may be observed on voltmeter 22 or some other suitable output device. The saturation direction of amplifier 18 will indicate the polarity of the input signal at the time switch 33 was opened. The low pass filter consisting of resistor 13 and capacitor 32 reduces the sensitivity of the circuit to momentary noise voltages across input terminals 11 and 12. When switch 33 is closed, the feedback path is interrupted, and the circuit will return to the initial equilibrium condition as the various capacitors discharge.

Switch 33 may be operated by a manual push button in which case the circuit of FIGURE 1 will provide a single indication of input voltage polarity "on demand." In many instances it will be desirable to have switch 33 automatically opened and closed at a desired rate to provide a continuing indication. In some instances it will be desirable for switch 33 to be closed for a longer time than it is open to allow the circuit to recover to an essentially equilibrium condition.

Figure 2:
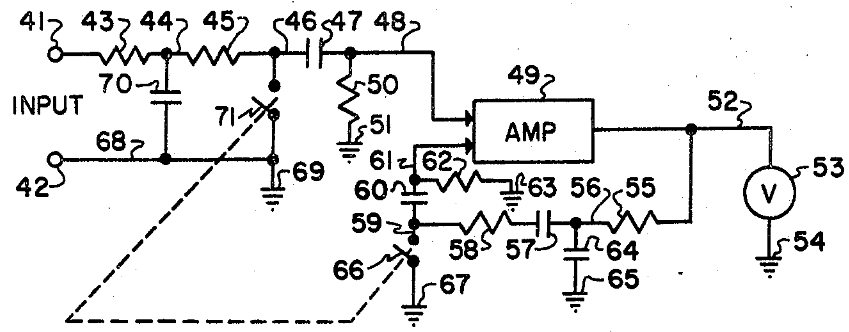
FIGURE 2 is a schematic illustration of a second form of the invention showing the use of a dual chopper and dual input amplifier to minimize feedback into the system input circuit.

Reference is now made to FIGURE 2 which is a schematic illustration of a second form of the invention showing the use of a dual chopper and dual input amplifier to minimize feedback into the system input circuit. FIGURE 2 includes input terminals 41 and 42. Input terminal 41 connects via resistor 43 to line 44 which in turn connects via resistor 45 to line 46. Line 46 connects via capacitor 47 to line 48 which connects to a first input of amplifier 49. Resistor 50 connects from line 48 to ground 51. The output of amplifier 49 on line 52 connects to a first side of voltmeter 53, the second side of which connects to ground 54. Line 52 also connects via resistor 55 to line 56, which connects via the series combination of capacitor 57 and resistor 58 to line 59. Line 59 connects via capacitor 60 and line 61 to a second input of amplifier 49. Resistor 62 connects from line 61 to ground 63. Capacitor 64 connects from line 56 to ground 65. Switch 66 connects from line 59 to ground 67. Input terminal 42 connects via line 68 to ground 69. Capacitor 70 connects from line 44 to line 68. Switch 71 connects from line 46 to line 68 and ground 69. Switches 66 and 71 are mechanically linked, as indicated by the dotted line of FIGURE 2, so as to open and close together.

A disadvantage of the circuit of FIGURE 1 for some applications is that the positive feedback voltage from the output of amplifier 18 is coupled into the input circuit and may appear across terminals 11 and 12. The circuit of FIGURE 2 is a second form of the invention which avoids this coupling.

Switch 33 of FIGURE 1 may be considered as performing two functions when it opens. First, it applies the input signal to the amplifier input. Second, it establishes the positive feedback path. In the circuit of FIGURE 2 these two distinct switching functions are performed by two distinct switches. For proper operation the two switches should operate at nearly the same instant. Amplifier 49 of FIGURE 2 is a summing amplifier whose output is essentially proportional to the sum of two independent inputs. The operation of the circuit of FIGURE 2 otherwise generally resembles the operation of the circuit of FIGURE 1.

Figure 3:
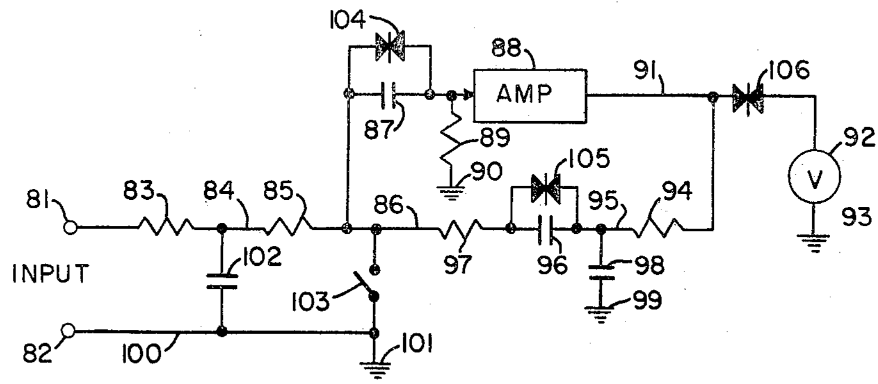
FIGURE 3 is a schematic illustration of a third form of the invention generally resembling the circuit of FIGURE 1 but with certain modifications to prevent low frequency oscillation in the amplifier circuit.

Reference is now made to FIGURE 3 which is a schematic illustration of a third form of the invention illustrating certain modifications to the circuit of FIGURE 1, to prevent low frequency circuit oscillation. FIGURE 3 includes input terminals 81 and 82. Terminal 81 connects via resistor 83 to line 84. Line 84 connects via resistor 85 to line 86 which connects via capacitor 87 to the input of amplifier 88. Resistor 89 connects from the input of amplifier 88 to ground 90. The output of amplifier 88 on line 91 connects through nonlinear element 106 to a first side of voltmeter 92, the second side of which connects to ground 93. Line 91 also connects via resistor 94 to line 95, which connects via the series combination of capacitor 96 and resistor 97 to line 86. Capacitor 98 connects from line 95 to ground 99. Terminal 82 connects via line 100 to ground 101. Capacitor 102 connects from line 84 to line 100. Switch 103 connects from line 86 to line 100 and ground 101. Nonlinear element 104 is connected across capacitor 87. Nonlinear element 105 is similarly connected across capacitor 96.

If switch 33 of FIGURE 1 remains open for an extended period of time, the circuit of FIGURE 1 will oscillate as the capacitors in the positive feedback path charge and discharge. In this case, the polarity of the input signal will be indicated by the polarity of the first half cycle of the oscillating output of amplifier 18. The circuit of FIGURE 3 illustrates one technique for preventing these oscillations so that the amplifier will remain saturated indefinitely in a direction indicating the polarity of the input signal at the time of the switch opening. The circuit of FIGURE 3 generally resembles the circuit of FIGURE 1 except for the addition of nonlinear circuit elements 104, 105 and 106. Immediately after switch 103 is opened, while the amplifier output voltage on line 91 is still small, the circuit of FIGURE 3 will function in the manner described for the circuit of FIGURE 1. However, as the output of amplifier 88 increases, nonlinear devices 104 and 105 will conduct, establishing a D.C. feedback path from the output of amplifier 88 back to its input so that it will remain in a saturated state. Nonlinear devices 104, 105 and 106 may be, for example, two Zener diodes connected in series opposition so as to conduct at voltages above some particular value. Nonlinear device 106 couples saturation voltage signals from line 91 to voltmeter 92, but blocks lower voltage signals which may be present on line 91 when switch 103 is closed and the circuit is settling back to an equilibrium condition.

Figure 4A:
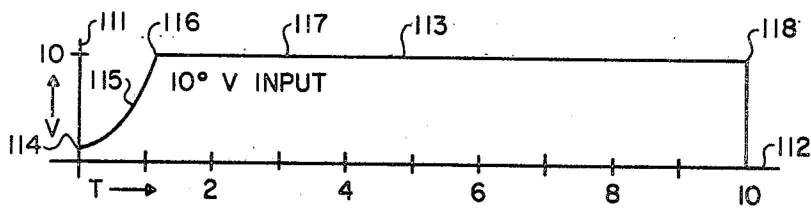
FIGURES 4A, 4B, 4C and 4D are diagrammatic illustrations of voltage waveforms corresponding to the voltage on line 21 of FIGURE 1 under four different operating conditions.

Reference is now made to FIGURES 4A, 4B, 4C, and 4D which give a diagrammatic illustration of certain voltage waveforms appearing, for example, on line 23 of the circuit of FIGURE 1. FIGURE 4A includes vertical axis 111 and horizontal axis 112. Curve 113 is plotted with respect to these two axes. For convenience, point 114, curve segment 115, point 116, curve segment 117, and point 118 of curve 113 are specifically identified and will be referred to subsequently.

Figure 4B:
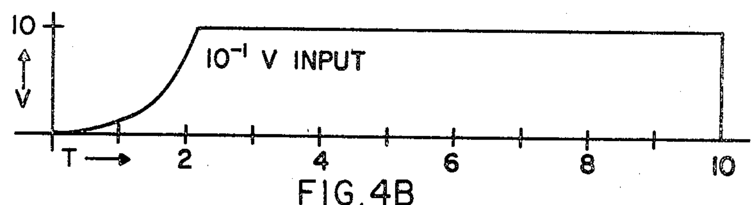
Figure 4C:
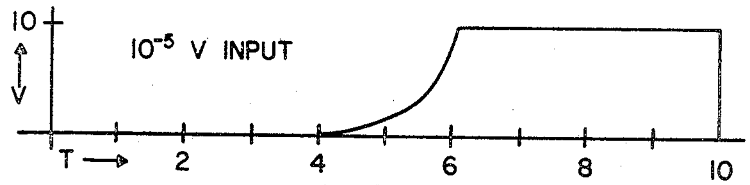
Figure 4D:
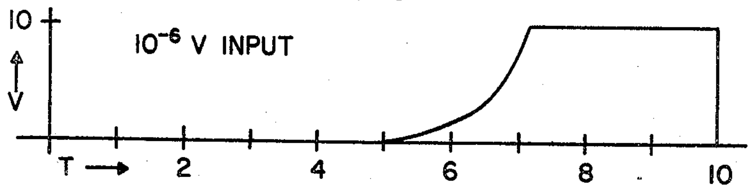

FIGURES 4A through 4D illustrate the output voltage as a function of time for a circuit such as that of FIGURE 3 for four different values of input voltage. We assume that the circuit constants are such that the amplifier output will increase by a factor of 10 in each unit of time. For example, the amplifier saturation point might be 10 volts and the regeneration time constant such that the amplifier output would increase by a factor of 10 each millisecond until reaching saturation. FIGURE 4A illustrates the amplifier output assuming that switch 103 of FIGURE 3 is open of 10 milliseconds. The input voltage and the initial amplifier output as indicated by point 114 are both assumed to be 1 volt. The amplifier output voltage will increase towards saturation along curve segment 115, reaching saturation in 1 millisecond at point 116. The amplifier output will then remain saturated for the remaining 9 milliseconds as indicated by curve segment 117. At point 118 at the end of 10 milliseconds, switch 103 closes and the amplifier output drops. In FIGURE 4B the input voltage and initial amplifier output voltages are assumed to be approximately .1 volt. The amplifier then requires 2 milliseconds to reach saturation and remains saturated for 8 milliseconds. With a 10 microvolt input as illustrated in FIGURE 4C, the amplifier will reach saturation in 6 milliseconds and remain saturated for the remaining 4 milliseconds. With a 1 microvolt input, as illustrated in FIGURE 4D, the amplifier will reach saturation in 7 milliseconds and remain saturated for the remaining 3 milliseconds.

If a suitable nonlinear element is placed in series with the meter, for example, as illustrated by nonlinear element 106 of FIGURE 3, the output meter will receive current only when the amplifier is saturated. The average meter deflection will then be an indication of the relative amount of time for which the amplifier is saturated. As may be seen from the examples shown in FIGURES 4A through 4D, the relative time during which amplifier 88 is saturated will be essentially proportional to the logarithm of the input signal over a wide range. This would allow a conventional panel meter to indicate the polarity and magnitude of input signals over a dynamic range of a million to one or greater without range switching.

Figure 5:
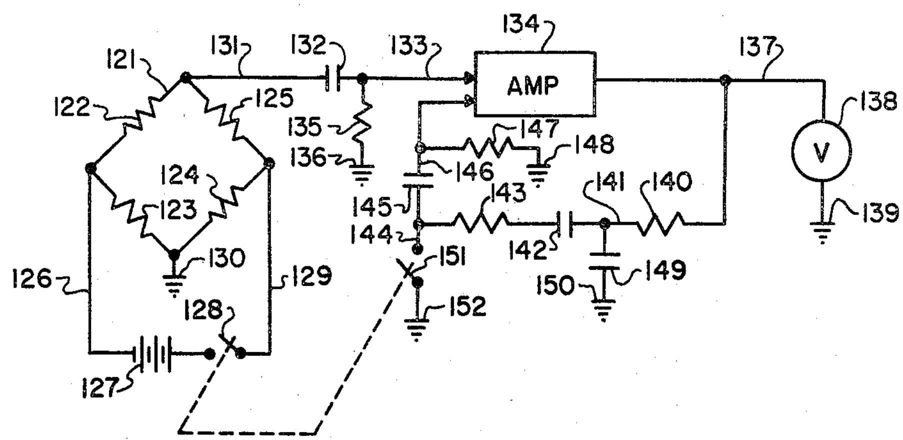
FIGURE 5 is a schematic illustration of a fourth form of the invention showing its application to the measurement of alternating voltage signals.

Reference is now made to FIGURE 5 which is a schematic illustration of a fourth form of the invention showing its application to the measurement of alternating voltage signals. Bridge circuit 121 of FIGURE 5 includes resistors 122, 123, 124 and 125 in a conventional Wheatstone bridge arrangement. Line 126 connects from the junction of resistors 122 and 123 to a first side of battery 127. The second side of battery 127 connects through switch 128 and line 129 to the junction of resistors 124 and 125. The junction of resistors 123 and 124 connects to ground 130. The junction of resistors 122 and 125 connects via line 131, capacitor 132 and line 133 to a first input of amplifier 134. Resistor 135 connects from line 133 to ground 136. The output of amplifier 134 on line 137 connects to a first side of voltmeter 138, the second side of which connects to ground 139. Line 137 connects via resistor 140, line 141, capacitor 142, and resistor 143 to line 144. Line 144 connects via capacitor 145 and line 146 to the second input of amplifier 134. Resistor 147 connects from line 146 to ground 148. Capactor 149 connects from line 141 to ground 150. Switch 151 connects from line 144 to ground 152.

The circuit of FIGURE 5 illustrates a further variation of the invention which may be of use with resistance bridges and in certain other applications. The circuit of FIGURE 5 generally resembles the circuit of FIGURE 2 except that the input signal is applied by energizing the bridge rather than by opening a switch which has shunted the input signal. An advantage of the circuit of FIGURE 5 is that it would be insensitive to thermoelectric voltages generated within the system. Bridge circuit 121 of FIGURE 5 may also be viewed as a source of alternating voltage signals. In this latter case, the remainder of the circuit of FIGURE 5 may be viewed as a detector for alternating voltages which are coherent with respect to the opening of switch 151.

The circuits illustrated in the drawings have shown mechanical switches for convenience. Semiconductor switches and/or other switching devices may be used to achieve higher switching speeds and/or other desired characteristics. The use of a voltmeter as an output indicator has been specifically described. Other forms of output indicating devices may also be used. For example, two series combinations of semiconductor diodes and miniature incandescent lamps with the diodes connected in opposite polarity senses could be connected between line 91 of FIGURE 3 and ground to indicate the polarity of the output on line 91.

The use of positive or regenerative feedback to increase the gain of an amplifier is well known. As an example, we might consider a simple amplifier with a positive gain of 10. Regenerative feedback of approximately 5% would increase the amplifier gain to approximately 20. If the regenerative feedback were increased to 10% (the reciprocal of the amplifier gain without feedback), the apparent amplifier gain would increase without limit. For positive feedback greater than 10% the amplifier system would be unstable and would either saturate at a maximum output condition or oscillate depending on whether or not the amplifier frequency response extended down to D.C. The condition of positive regenerative feedback in excess of that required to produce an essentially unlimited gain will be referred to in the claims as a superregenerative state. A non-superregenerative state will be referred to in the claims as a stable state. In the circuit of FIGURE 1 the positive feedback path from line 21 through resistor 24, line 25, capacitor 26, resistor 27, line line 16 and capacitor 17 is more than sufficient to place amplifier 18 in a superregenerative state when switch 33 is open. Closing and opening switch 33 will alternately place amplifier 18 in a stable state and in a superregenerative state. The circuit of amplifier 18 is first stabilized in the stable state when switch 33 is closed so as to establish the zero reference level. The superregenerative state when switch 33 is opened then serves to provide extremely high effective gain from a moderate gain amplifier.

The term "essentially unidirectional" is used in the claims to describe electric signals. This term is intended to describe signals which are unidirectional or which alternate or vary at frequencies which are low with respect to the sampling action of the measurement system.

What is claimed is:

1. Apparatus for measuring an electric test signal including a source of said test signal, regenerative amplifying means having first input terminal means connected to the source of test signal, a second input terminal means connected to a reference point, a first output terminal means, a second output terminal means connected to the reference point, regenerative positive feedback means coupling a positive feedback signal from the first output terminal means to the first input terminal means, and means synchronously coupling the test signal and the feedback signal to the reference point at a first switch condition and synchronously decoupling the test signal and the feedback signal from the reference point at a second switch condition.

2. Apparatus for measuring the polarity and magnitude of an essentially unidirectional electric test voltage signal including a source of said test signal, regenerative amplifying means having first input terminal means connected to the source of test signal, a second input terminal means connected to a reference point, a first output terminal means, a second output terminal means connected to the reference point, regenerative positive feedback means coupling a positive feedback signal from the first output terminal means to the first input terminal means, means synchronously coupling the test signal and the feedback signal to the reference point at a first switch condition and synchronously decoupling the test signal and the feedback signal from the reference point at a second switch condition, and signal measurement means responsive to the output of said amplifying means.

3. Electric signal measurement means including a source of an electric voltage signal to be measured, an electronic amplifier with input terminals and output terminals, means capacitively coupling said source to said input terminals, means capacitively coupling said output terminals to said input terminals, switching means to alternately apply said signal to said input terminals and remove said signal from said input terminals, switching means to alternately place said amplifier into a superregenerative state synchronously with application of said signal to said input terminals and into a non-superregenerative state synchronously with removal of said signal from said input terminals, and signal measurement means responsive to an output of said amplifier.

4. A measurement circuit comprising an amplifier for essentially unidirectional signals having an input and an output, a positive feedback path connected from the output to the input which includes capacitive coupling between the output and the input, means for capacitively coupling a signal to be measured from a signal input terminal to the amplifier input, and switching means to synchronously apply the signal to the amplifier input and place the amplifier into a superregenerative state at a first switch condition and to synchronously remove the signal from the amplifier input and place the amplifier into a non-superregenerative state at a second switch condition so that application of the signal at the first switch condition drives the amplifier toward a saturation condition and the amplifier reverts toward a stable state at the second switch condition.

5. The circuit of claim 4 including a non-linear element connected across the capacitive coupling between the output and the input, the non-linear element having a high value of resistance at low applied voltage and a low value of resistance at a high applied voltage.

6. The circuit of claim 4 including an indicator, and a non-linear element connected between the amplifier output and the indicator, the non-linear element having a high value of resistance at a low applied voltage and a low value of resistance at a high applied voltage level corresponding substantially to the voltage which exists at the amplifier output when the amplifier has reached a saturation level in a superregenerative state.

7. A circuit for indicating the polarity of a bridge output voltage comprising a resistance bridge having a pair of signal terminals across a first diagonal and a pair of power terminals across a second diagonal, a bridge power supply, first connecting means for selectively connecting and disconnecting the power supply between the bridge power terminals, an amplifier for essentially unidirectional signals having an input and an output, first capacitive means coupling the bridge signal terminals to the amplifier input, second capacitive means connecting the amplifier output to the amplifier input to complete a positive feedback path, second connecting means connected to the feedback path and adapted to selectively place the amplifier into a superregenerative state and into a stable state, means synchronously connecting the first and second connecting means, and indicating means responsive to the amplifier output connected to the amplifier output.

8. The circuit of claim 4 wherein the positive feedback path includes a low pass filter so that the amplifier output is driven towards saturation at a substantially exponential rate at the first switch condition.

References Cited

UNITED STATES PATENTS

| | | | |
|---|---|---|---|
| 1,218,650 | 3/1917 | Hartley | 330—112 XR |
| 3,106,684 | 10/1963 | Luik | 330—112 XR |
| 2,684,999 | 7/1954 | Goldberg et al. | 330—9 |
| 3,070,786 | 12/1962 | MacIntyre | 330—9 XR |
| 3,264,569 | 8/1966 | Lefferts | 330—9 |

RUDOLPH V. ROLINEC, Primary Examiner

E. F. KARLSEN, Assistant Examiner

U.S. Cl. X.R.

330—26, 112

PO-1050
(5/69)

UNITED STATES PATENT OFFICE
CERTIFICATE OF CORRECTION

Patent No. 3,484,692 Dated December 16, 1969

Inventor(s) Tenny D. Lode

It is certified that error appears in the above-identified patent and that said Letters Patent are hereby corrected as shown below:

Column 1, line 5, "Rosemound" should be -- Rosemount -- .

SIGNED AND
SEALED
JUN 16 1970

(SEAL)
Attest:

Edward M. Fletcher, Jr.
Attesting Officer

WILLIAM E. SCHUYLER,
Commissioner of Pate